United States Patent [19]

Horiie

[11] Patent Number: 5,534,590
[45] Date of Patent: Jul. 9, 1996

[54] POLYMER COMPOSITE, ITS MOLDED ARTICLE AND LAMINATE

[75] Inventor: Takafumi Horiie, Kyoto, Japan

[73] Assignee: Sanyo Chemical Industries, Ltd., Kyoto, Japan

[21] Appl. No.: 122,571

[22] PCT Filed: Apr. 5, 1993

[86] PCT No.: PCT/JP93/00441

§ 371 Date: Oct. 5, 1993

§ 102(e) Date: Oct. 5, 1993

[87] PCT Pub. No.: WO93/21246

PCT Pub. Date: Oct. 28, 1993

[30] Foreign Application Priority Data

| Apr. 9, 1992 | [JP] | Japan | 4-117939 |
| Jul. 8, 1992 | [JP] | Japan | 4-206004 |
| Oct. 21, 1992 | [JP] | Japan | 4-308261 |

[51] Int. Cl.$^6$ ............................. C08L 51/04; C08L 55/00
[52] U.S. Cl. ................ 525/71; 525/64; 525/66; 525/68; 428/528
[58] Field of Search ................ 525/71, 194; 428/523

[56] References Cited

U.S. PATENT DOCUMENTS

| 4,757,112 | 7/1988 | Phadke et al. | 525/66 |
| 5,237,003 | 8/1993 | Otawa et al. | 525/66 |
| 5,266,634 | 11/1993 | Ito et al. | 525/67 |

FOREIGN PATENT DOCUMENTS

| 55-50007 | 4/1980 | Japan . |
| 61-9474 | 1/1986 | Japan . |
| 63-4562 | 1/1988 | Japan . |
| 63-20841 | 4/1988 | Japan . |
| 63-15826 | 4/1988 | Japan . |
| 3-52764 | 8/1991 | Japan . |
| 3-64525 | 10/1991 | Japan . |
| 3-250010 | 11/1991 | Japan . |

*Primary Examiner*—Ana L. Carrillo
*Attorney, Agent, or Firm*—Birch, Stewart, Kolasch & Birch

[57] ABSTRACT

A polymer composite having excellent mechanical properties such as shock resistance, and good adhesiveness is obtained by polymerizing a vinyl monomer in the presence of a rubber-like copolymer and a thermoplastic resin without a substantial amount of a solvent. The polymer composite contains a matrix phase which comprises the thermoplastic resin and a graft copolymer formed from the resin and the vinyl monomer, and a dispersed phase which comprises the polymer of the vinyl monomer and a graft polymer formed from the vinyl monomer and the rubber-like copolymer. Preferably the reaction is carried out by kneading the vinyl monomer, the rubber-like copolymer and the thermoplastic resin with a high shearing force and removing an unreacted vinyl monomer. A single screw vent-extruder or a twin screw vent-extruder may be used for kneading. The polymer composite is useful for making a formed article and as a binder in a laminate.

18 Claims, No Drawings

POLYMER COMPOSITE, ITS MOLDED ARTICLE AND LAMINATE

TECHNICAL FIELD OF THE INVENTION

The present invention relates to a polymer composite whose dispersed phase (discontinuous phase) is distributed homogeneously. More specifically, the present invention relates to the polymer composite which possesses excellent mechanical properties such as restorable ability or shock resistance, coating property, and adhesiveness. Furthermore, the present invention relates to an article molded from the above-mentioned polymer composite, and to a laminate wherein the polymer composite is used to be an adhesive.

TECHNICAL BACKGROUND OF THE INVENTION

A vinyl type thermoplastic resin (used as for a vinyl type thermoplastic resin including an aromatic vinyl, an acrylic ester, etc., hereinafter) is widely used to be an economical material which shows excellent properties in molding and forming. However, it may not be sufficient in high-shock resistance, coating properties, and adhesiveness as to be materials. Therefore, variety of vinyl types thermoplastic polymer composites are provided to improve the properties of the articles molded from vinyl type thermoplastic resins.

JP A 64-11147 (1989) discloses a mixture of polypropylene series resin and a graft-copolymer wherein an aromatic vinyl compound and an unsaturated epoxy are grafted on a rubber. The thermoplastic resin molded article wherein polyolefin, a rubber on which acid anhydride is graft-copolymerized, and polystyrene are blended is disclosed in U.S. Pat. No. 5,070,143. In U.S. patent application Ser. No. 07/732,907 and Ser. No. 7/957,036, a polymer composite wherein a polyurethane elastomer is dispersed in a thermoplastic resin such as polyolefin is suggested. Further in U.S. Pat. No. 3,178,489, a polymer composite obtained by polymerizing a mixture of styrene and methyl methacrylate in a styrene-butadiene copolymer; a continuous production method of a polymer composite obtained by polymerizing a copolymeric prepolymer of styrene and acrylonitrile in a styrene solution of styrene-butadiene copolymer in U.S. Pat. No. 3,511,896 is disclosed. Further in U.S. Pat. No. 4,381,371, a blend of amorphous polyamide and an ABS copolymer resin to improve a shock resistance of polyamide resin; in EP 216,505, a blend of polyimide and a thermoplastic resin to improve a shock resistance of a polyimide resin; in U.S. Pat. No. 4,277,575, a blend of polyarylene ether, polystyrene and a hydrostyrene-butadiene-styrene block copolymer to improve shock resistance of a polyarylene ether resin are disclosed. U.S. Pat. No. 4,554,314 discloses a blend of a polymer alloy of polyethylene telephthalate-polycarbonate and a polymer wherein a mixture of methylmethacrylate and stylene is grafted on a butadiene copolymer.

However, there are problems to be solved: mechanical strength, shock resistance, restoring force, and thermostability of the above-mentioned blends or composites are not perfectly sufficient. Moreover, manufacturing processes are complicated. Some of the above-mentioned polymer composites, for example, a polymer composite comprising polyolefin and polyurethane needs increased thermostability.

DISCLOSURE OF THE INVENTION

Subsequently, the present invention provides a polymer composite which is obtained by polymerizing a vinyl monomer selected from the group consisting of a styrenic monomer, acrylonitrile, methacrylonitrile, an ethylenically unsaturated carboxylic acid, an acid anhydride of said carboxylic acid, and an ester of said carboxylic acid, in a mixture of a rubber-like copolymer and a thermoplastic resin selected from the group consisting of a polyolefin, a polyamide, a polyimide, a polyarylene ether, a polyacetal, and a polyester substantially under the absence of a solvent.

The polymer composite of the present invention possesses a stable disperse phase (discontinuous phase), and is useful for a raw material of an elastomer and a molded article which requires excellent properties for molding and heat-resisting. Moreover, the polymer composite may be used to be an adhesive having excellent adhesion properties. A laminate employing this adhesive also possesses excellent properties and is useful.

BEST MODE FOR CARRYING OUT THE INVENTION

Firstly, constituents of the polymer composite of the present invention are described.

In general, the polymer composite of the present invention is formed morphologically by a continuous phase (a matrix phase) and a dispersed phase. The continuous phase principally comprises a thermoplastic resin and a graft copolymer of a thermoplastic polymer and a vinyl monomer. The dispersed phase comprises a copolymer of vinyl monomers, and a graft copolymer of a rubber-like copolymer and a vinyl monomer.

The vinyl monomer which is employed to the polymer composite of the present invention is one or a combination of more than two monomers selected from a styrenic monomer, acrylonitrile, methacrylonitrile, an ethylenically unsaturated carboxylic acid, an anhydride of said carboxylic acid, and an ester of said carboxylic acid. Among these monomers, the styrenic monomer includes styrene, t-butylstyrene, α-methylstyrene, p-methylstyrene, chlorostyrene, bromostyrene, fluorostyrene, ethylstyrene, divinylbenzene, N,N-diethylamino-styrene, and the like. Among these substances, styrene and α-methylstyrene are preferred. The ethylenically unsaturated carboxylic acid and its anhydride include acrylic acid, methacrylic acid, maleic anhydride, fumaric acid, iraconic acid, and anhydrides of these substances. The ethylenic unsaturated carboxylic ester includes methyl, ethyl, propyl, hydroxyethyl, glycidyl, cyclohexyl, dicyclohexyl, phenyl, naphthyl and p-methylphenyl ester of the above-mentioned carboxylic acids. Among these vinyl monomers, acrylic acid, methacrylic acid, maleic anhydride, esters of these substances, acrylonitrile and a mixture of these substances are preferred. The content of the polymer of the vinyl monomer in the polymer composite of the present invention is preferably from 20 to 80% by weight based on the weight of the polymer composite.

The rubber-like copolymer used in the present invention includes an olefin-diene copolymer, a styrenic monomer-diene copolymer, and partially hydrogenated products of the forementioned substances, and said rubber-like copolymer may be used either in form of a block copolymer or a random copolymer. The olefin includes ethylene and propylene. The diene includes butadiene, isoprene, 2,3-dimethyl-1,3-butadiene, 1,3-pentadiene, 2- methyl-1,3-pentadiene, 1,3-hexadiene, 4,5-diethyl-1,3-octadiene, 3-butyl-1,3-octadiene, chloroprene, and the like. Among these substances, butadiene and isoprene are preferred. The styrenic monomer includes styrene, and α-methyl styrene. Among these substances, a preferred rubber-like copolymer is a styrene series monomer diene copolymer. The most preferred rubber-like copolymer is a copolymer having a polystyrene block and either a polybutadiene block or a polyisoprene block, and a random copolymer of styrene-butadiene.

The content of the olefin or styrene unit in said rubber-like copolymer is generally from 5 to 90 weight %, and preferably from 10 to 85 weight %. When said content is less than 5 weight %, a compatibility of a polymer of the vinyl monomer with the rubber like copolymer may be decreased. When exceeding 90 weight %, it causes a decrease in the rate of grafting of the vinyl monomer and the dispersibility of a polymer of a vinyl monomer into thermoplastic polymers. As a result, it decreases mechanical strength and elasticity of the polymer composite.

The thermoplastic resin used in the present invention is a single polymer or a combination of more than two polymers selected from a polyolefin, a polyamide, a polyimide, a polyarylene ether, a polyacetal and a polyester. The polyolefin includes polyethylene (high density polyethylene, medium density polyethylene, and low density polyethylene), a copolymer of ethylene and other vinyl compound more than one (for example, α-olefin, vinyl acetate, methacrylic acid, and acrylic acid), polypropylene or a copolymer of propylene and other one or more vinyl compound, polybutene, and poly- 4 -methylpentene-1. Moreover, those thermoplastic resins being grafted with an ethylenically unsaturated carboxylic acid, acrylonitrile or methacrylonitrile may be included to the above-mentioned thermoplastic resins. A blend of two or more those thermoplastic resin may be used. Among these resins, preferred are a propylene homopolymer, a propylene-ethylene copolymer, an ethylene homopolymer, and an ethylene-vinyl acetate copolymer. The number average molecular weight of polyolefin is generally from 700 to 500,000, and preferably from 1,000 to 200,000.

The polyamide resin includes nylon 6, nylon 66, nylon 10, nylon 11, nylon 12, and nylon 46. The polyimide resin includes a polycondensation product of pyromellitic acid and 1,4-diaminobenzene. A polyamide resin having an imide group on a main chain and a polyimide resin having an amide group on a main chain are also included to the polyamide resin and the polyimide resin according to the present invention. The polyarylene ether resin also includes polyarylene thioether. The polyarylene ether resin may include poly-phenylene ether, polyphenylene sulfide, polyaryl sulfone and polyether etherketone (PEEK). The polyacetal resin includes polyoxymethylene. The polyester resin includes aromatic polyesters such as polyethylene terephthalate, polybutylene terephthalate, a polycondensation product of bisphenol A, and terephthalic acid and/or isophthalic acid, a poly condensation product of paraoxybenzoic acid, polycarbonate, and a mixture of these substances.

Secondly, the composition of the polymer composite of the present invention is described.

The weight ratio of the vinyl monomer: the rubber-like polymer: the thermoplastic resin which are containing in the present invention is respectively 100:10 to 1000:10 to 1000. When the polymer composite of the present invention is used to be an adhesive, said weight ratio is preferred to be altered to 100:50 to 300:50 to 300. For a purpose of using to be an adhesive, when the weight proportion of the vinyl monomer to the rubber-like copolymers or of the vinyl monomer to the thermoplastic resins is decreased less than 50 or exceeded to 300, the mechanical strength and the adhesive properties may be lower. For use in an elastomeric article, the above-mentioned ratio of three components may be 100:50 to 300; 50 to 300 to improve moldability. Furthermore, the total weight of the polymer of the vinyl monomer and the rubber-like copolymer is preferred to comprise a prime weight of the polymer composite. The prime weight implies that the total weight of the polymer of the vinyl monomer and the rubber-like copolymer is greater than any of the other constituents. In general, the total weight of these two substances is preferred to exceed 50 weight %.

A polymer composite used for an adhesive most preferably comprises of:

(1) a polymer of styrenic monomers or a styrene-acrylic ester copolymer;

(2) a copolymer, wherein the styrenic monomer singly or a mixture of styrene and acrylic ester are grafted on the rubber-like copolymer; and (3) a copolymer, wherein the styrenic monomer singly or a mixture of styrene and acrylic ester are grafted on the polyolefin.

A polymer composite used for an elastomer most preferably comprises:

(4) a polymer of the styrenic monomer or the copolymer of styrene-acrylic ester;

(5) a copolymer, wherein the styrenic monomer, or a combination of styrene and acrylic ester are grafted on the rubber-like copolymer containing from 5 to 40 weight % of a styrenic monomer; and (6) a copolymer, wherein the styrenic monomer or a combination of styrene and acrylic ester are grafted on the polyolefin.

Among the above-mentioned compositions, to improve the compatibility with (2) or (5), the content of the styrenic monomer in the constituent of (1) or (4) is generally not less than 30 weight %, and preferably not less than 50 weight %, based on the constituent of (1) or (4).

Additional substances of the above-mentioned constituents, a reinforcing agent such as calcium carbonate, silica, a clay, and a glass fiber; an antioxidant; a heat-stabilizer; an ultraviolet absorber; colorants; lubricants; fire retardant; pigments; a adhesive promoter (for example, a tackifier such as a rosin derivative, a terpene resin, a petroleum resin); a wax such as a paraffin wax, a microcrystalline wax, a low-molecular weight polyolefin wax; and a plasticizer may be contained in the polymer composite of the present invention as additives.

Production methods of the polymer composite of the present invention will be described hereinafter.

The polymer composite of the present invention is obtained by polymerizing the vinyl monomer in the presence of the rubber-like polymer and the thermoplastic resin in a kneading machine with a high shearing force, not employing a substantial amount of a solvent therein. During the process of polymerization, small or large part of the vinyl monomer is grafted on the rubber-like copolymer or the thermoplastic resin which are coexisting. Meaning of "not employing a substantial amount of a solvent therein" is not to eliminate "the existence of small amount of the solvent in order to dissolve a polymerization initiator which is hardly dissolved or dispersed in the vinyl monomer", but "rather not adding a solvent for the purpose of proceeding a polymerization in the solvent".

The polymer composite of the present invention is preferably obtained by kneading and polymerizing a mixture of the vinyl monomer and a polymerization initiator in the state, wherein the rubber-like copolymer and the thermoplastic resin are melt or nearly melt, under application of high shearing force. More preferably, after polymerizing the vinyl monomer with a high shearing force, unreacted vinyl monomers are removed with a lower shearing force. A polymerization temperature may be a temperature being capable of polymerizing the vinyl monomer. It is generally from 80° to 260° C. It takes from 10 seconds to 60 minutes to polymerize the vinyl monomer. It may be also controlled by a period of kneading the vinyl monomer with a high shearing force.

To be a polymerization reactor, a kneading machine including a single screw extruder reactor or a twin screw extruder reactor, a horizontal twin biaxial kneader of a self-cleaning type or of a spectacle planetary type, a co-kneader, and Banbury mixer may be used. Among these reactors, either the single screw or the twin screw extruder having a vent hole are preferred because of their high properties in mixing resins and of economical performance. In the screw extruder, generally a portion for heating and melting raw materials locates connecting to an inlet for feeding the raw materials. At the kneading portion having high shearing force, polymerization of the vinyl monomer is carried out with kneading the raw materials. At a vent portion connecting to the kneading portion, unreacted vinyl monomers are removed from a vent hole with the shearing force, which is lower than at the kneading portion, at atmospheric pressure or under reduced pressure. An exhausting and/or evacuating apparatus are adopted at the vent hole. Then the polymer composite of the present invention is extruded from an extruding portion via a die, formed, and cooled. When polymerizing the vinyl monomer, an initiator, e.g., peroxide such as dicumyl peroxide or azo compound such as azo-isobutyronitrile may be employed.

EXAMPLES

The present invention is further illustrated in detail by the following examples and comparative examples. All parts in the examples and comparative examples herein are indicating weight parts unless otherwise specified.

Examples 1 to 8, 10, and 13: Comparative Examples 1 to 5

Using a co-rotation twin screw vent extruder of which screw diameter is 45 mm, and L/D=50, a polymer composite of the present invention and resins of the comparative examples were produced. This extruder comprised quarter partition barrels which were respectively capable of controlling a temperature. A raw material feed hole was in front of the first barrel. A vent hole was on the forth barrel. A type of screws corresponding to the third barrel was reverse. Pitch of the screws nearby the vent hole was 30 mm. It was kept at 145° C. for the first barrel of the extruder, at 160° C. for the second barrel, at 190° C. for the third barrel, and at 230° C. for the forth barrel. Then the temperature of extruding die was kept at 230° C., reducing a pressure to 20 Torr on the vent hole. In each example and comparative example, a pre-mixture with the constituent proportion shown in Table 1 was polymerized by supplying the mixture from the feed hole to set a dwell time to 7 minutes. The unreacted monomer was removed at the vent hole, and the obtained polymer composite and the resins of the comparative examples were extruded via the die.

Physical properties of the thus obtained polymer composites and resins are shown in Table 2.

TABLE 1

| | Dimention: Parts by Weight | | | | | |
|---|---|---|---|---|---|---|
| | | Initiator Dicumyl | Rubber-like Copolymer | | | Thermo plastic |
| | Vinyl Monomer | peroxide | SBS | SEBS | SIS | resin |
| Ex. | | | | | | |
| 1 | Styrene: 70 | 1.4 | 20 | 3 | | PA1: 10 |
| 2 | Styrene: 40 | 1.2 | 30 | 3 | | PA1: 30 |
| 3 | Styrene: 20 | 0.8 | 20 | 3 | | PA1: 60 |
| 4 | Styrene: 40 | 1.2 | — | 3 | 30 | PA1: 30 |
| 5 | Styrene: 30 | 1.4 | 20 | 3 | | PA1: 25 PA2: 25 |
| 6 | Styrene: 20 α-Methyl Styrene: 20 | 1.2 | 30 | 3 | | PA1: 30 |
| 7 | Styrene : 20 | 1.2 | 30 | 3 | | PA1: 30 |

TABLE 1-continued

| | | Dimention: Parts by Weight | | | | | |
|---|---|---|---|---|---|---|---|
| | | | Initiator Dicumyl | Rubber-like Copolymer | | | Thermo plastic |
| | Vinyl Monomer | | peroxide | SBS | SEBS | SIS | resin |
| 8 | Butyl Acrylate: Styrene Acrylonitrile: | 20 30 10 | 1.2 | 30 | 3 | | PA1: 30 |
| 9 | Styrene: | 40 | 1.2 | 30 | 3 | | PBT: 30 |
| 10 | Styrene: | 40 | 1.2 | 30 | 3 | | TPU: 30 |
| 11 | Styrene: | 40 | 1.2 | 30 | 3 | | PPS: 30 |
| 12 | Styrene: | 40 | 1.2 | 30 | 3 | | PI: 30 |
| 13 | Styrene: | 40 | 1.2 | 30 | 3 | | EP: 30 |
| Comparative Ex. | | | | | | | |
| 1 | Resin A: | 70 | | | 3 | | PA1: 30 |
| 2 | (Resin A was produced by polymerizing | | | | 3 | | PBT: 30 |
| 3 | 40 parts of stylene with 0.8 parts of | | | | 3 | | PPS: 30 |
| 4 | dicumylpe oxide in presence of 30 parts | | | | 3 | | PI: 30 |
| 5 | of SBS in a twin-extruder.) | | | | 3 | | EP: 30 |

(Remarks)
SBS: Styrene-butadiene Block Copolymer (JSR TR2000: Japan Synthetic Rubber Co., Ltd.)
SEBS: Hydrogenated SBS (Kraton G1657: Shell Chemical, Ind.)
SIS: Styrene-Isoprene Block Copolymer (Kraton D1112: Shell Chem., Ind.)
PA1: Dimer acid Polyamide (Polyamide S52: Sanyo Chemical Ind., Ltd.)
RA2: Nylon 12 (3024U: Ube Industries, Ltd.)
PBT: Polybutylene-terephtarate (PBT1401-XO6: Toray Ind., Inc.)
TPU: Thermoplastic polyurethane (2103-70A: MD Chemical, Co.)
PPS: Polyphenylene Sulfide Resin (PPS GS-40: Tosoh Co.)
PI: Polyimide Resin (NE-20200: Nippon Polyimide, Ind.)
EP: Epoxy Resin (Epicote 1001; Shell Chemical, Ind.)

TABLE 2

| | Tensile Strength (Kg/cm$^2$) | Tensile Fracture Elongation (%) | Shock Resistance | Dispersion |
|---|---|---|---|---|
| Ex. | | | | |
| 1 | 280 | 200 | N.B. | o |
| 2 | 300 | 320 | N.B. | o |
| 3 | 330 | 360 | N.B. | o |
| 4 | 250 | 350 | N.B. | o |
| 5 | 200 | 300 | N.B. | o |
| 6 | 280 | 280 | N.B. | o |
| 7 | 250 | 300 | N.B. | o |
| 8 | 350 | 200 | N.B. | o |
| 9 | 250 | 150 | N.B. | o |
| 10 | 150 | 500 | N.B. | o |
| 11 | 480 | 100 | N.B. | o |
| 12 | 500 | 110 | N.B. | o |
| 13 | 150 | 200 | N.B. | o |
| Comparative Ex. | | | | |
| 1 | 80 | 50 | 5 | Δ |
| 2 | 50 | 10 | 5 | Δ |
| 3 | 80 | 10 | 7 | x |
| 4 | 100 | 5 | 6 | x |
| 5 | 20 | 10 | N.B. | Δ |

(Remarks)
Tensile Strength: JIS K6301
Tensile Fracture Elongation: JIS K6301
Shock Resistance (knoched Izot test): JIS K7110
Dispersion: Partcle diameter observed by scanning electron microscope
o: under 10 μm
Δ: 10–20 μm
x: Phase separation state Example 9, 11, 12

Employing the same extruder used in Example 1, the temperatures of all the four barrels were kept at 250° C. Polymer composites of the present invention was produced under the same conditions of Example 1 except using the pre-mixture having the constitution proportion mentioned in Table 1 as a raw material.

The physical properties of the thus obtained polymer composites are shown in Table 2.

Example 14 to 20, Comparative Example 6 and 7

Under the same conditions of Example 1 except using the raw materials and the constitution proportion mentioned in Table 3, employing the same extruder used in Example 1, setting a temperature for the first barrel at 145° C.; for the second barrel at 160° C.; for the third barrel at 190° C.; and for the fourth barrel at 200° C., and also setting a temperature for the extruder die at 220° C., in Examples, polymer composites of the present invention which is suitable for an adhesive were respectively produced, and in Comparative Examples, resins were respectively produced.

The physical properties of the thus obtained polymer composites and resins are shown in Table 4.

TABLE 3

| | Styrene | Acrylic acid | Dicumyl Peroxide | SBS | SEBS | PP-1 | PP-2 |
|---|---|---|---|---|---|---|---|
| Ex. | | | | | | | |
| 14 | 70 | 1.4 | 20 | 3 | 10 | | |
| 15 | 60 | 1.2 | 20 | 3 | 20 | | |
| 16 | 40 | 0.8 | 20 | 3 | 40 | | |
| 17 | 50 | 1.0 | 10 | 3 | 40 | | |
| 18 | 70 | 1.4 | 10 | 3 | | 20 | |
| 19 | 60 | 1.2 | 20 | 3 | | 20 | |
| 20 | 50 | 10 | 1.2 | 20 | 3 | 20 | |
| Comparative Ex. | | | | | | | |
| 6 | Resin B: 60 | | | 20 | 3 | 20 | |
| 7 | Resin C: 80 | | | — | 3 | 20 | |

Unit: parts by weight (Remarks)
PP-1: Polypropylene (UP Polypro J609H: Ube Ind., Ltd.)
PP-2: Polypropylene (UP Polypro RJ385: Ube Ind., Ltd.)
Resin B: Polystyrene (number average moleculer wt.: 8000)
Resin C was produced by polymerizing 40 parts of styrene with 0.8 parts of dicumylperoxide in presence of 30 parts of SBS (TR2000: Japan Synthetic Rubber Co., Ltd.) in a twin-extruder.

TABLE 4

| | Tensile Strength (Kg/cm$^2$) | Tensile Fracture Elongation (%) | Restoring Force | Coating Properties |
|---|---|---|---|---|
| Ex. | | | | |
| 14 | 250 | 300 | 40 | 100 |
| 15 | 250 | 350 | 30 | 100 |
| 16 | 250 | 360 | 20 | 100 |
| 17 | 250 | 350 | 30 | 100 |
| 18 | 300 | 400 | 20 | 100 |
| 19 | 320 | 430 | 15 | 100 |
| 20 | 300 | 300 | 40 | 100 |
| Comparative Ex. | | | | |
| 6 | 130 | 10 | *1 | 40 |
| 7 | 150 | 60 | *1 | 10 |
| PP-1 | 300 | 700 | 55 | 0 |

(Remarks)
Tensile Strength: JIS K6301
Tensile Fracture Elongation: JIS K6301
Restoring Force: A 150 mm length, 90 mm width and 3 mm thick plate was bent to 180 degree at the center of longitudinal direction and kept 10 seconds. Then, the bending force was removed and measured an angle from horizontal after 10 seconds. (0 value means a complete restoring state.)
Coating Properties: A sample face coated with a two pack urethane was evaluated by cross cutting test, and a values in table 4 means a number of no peel section to 100 sections.
*Broken by test.

Example 21 to 29: Comparative Example 8 and 9

Under the same conditions of Example 1 except using the raw materials and the constitution proportion mentioned in Table 5, employing the same extruder used in Example 1, setting a temperature for the first barrel at 145° C.; for the second barrel at 160° C.; for the third barrel at 190° C.; and for the fourth barrel at 200° C., and also setting a temperature for the extruder die at 220° C., in Examples, polymer composites of the present invention which is suitable for an adhesive were respectively produced, and in Comparative Examples, resins were respectively produced.

To 100 parts of the obtained polymer composites and the resins respectively, 100 parts of tackifier (ADMARV P100: Mitsui Petrochemical Ind. Ltd.), 50 parts of process oil (DIANA PROCESS PW90: Idemitsu Kosan Co., Ltd.), and 2.5 parts of antioxidant (Irganox 1010: Ciba-Geigy Co., LTD.) were added. The obtained mixture was mixed and melt at 180° C. by using a laboplastomill, and a hot-melt adhesive was thus obtained. A shear strengh by tension loading and a peel strength of the obtained hot-melt adhesive were measured. Test pieces were made onto a 25×25 mm alminium sheet or PET film having a spacer of 200 micron by applying the adhesive and giving a heat-press treatment for three minutes. The results of the measurement are shown with the resalts of heat-stabilities of said polymer composites on Table 6.

TABLE 5

| | Styrene | Dicumyl Peroxide | SBS | SBR | PP-1 | PPMA | EVA |
|---|---|---|---|---|---|---|---|
| Ex. | | | | | | | |
| 21 | 70 | 0.7 | 10 | | | | 20 |
| 22 | 60 | 0.6 | 20 | | | | 20 |

Dimention: parts by weight

TABLE 5-continued

| | Styrene | Dicumyl Peroxide | SBS | SBR | PP-1 | PPMA | EVA |
|---|---|---|---|---|---|---|---|
| 23 | 40 | 0.4 | 30 | | | | 30 |
| 24 | 30 | 0.3 | 30 | | | | 40 |
| 25 | 35 +Acrylic amide: 5 | 0.4 | 30 | | 30 | | |
| 26 | 35 +Maleic Anhydride: 5 | 0.4 | 30 | | 30 | | |
| 27 | 35 +Acrylonitrile: 5 | 0.4 | 30 | | | | 30 |
| 38 | 40 | 0.6 | | 30 | | | 30 |
| 29 | 40 | 0.6 | | 30 | | 15 | 15 |
| Comparative Ex. | | | | | | | |
| 8 | Resin D: 100 | | | | | | |
| 9 | Resin D: 60 | | | | | 40 | |

Dimention: parts by weight (Remarks)
PPMA: Low molecular weight polypropylene modified by maleic anhydride (YOUMEX 1001: Sanyo Chemical Industries, Ltd.)
SBR: Styrene-butadiene random copolymer (JSR-SL552: Japan Synthetic Rubber Co., Ltd.)
EVA: Ethylene-vinylacetate copolymer (EVATATE D5020 Sumitomo Chemical Company, Ltd.)
Resin D: Maleated product of hydrogenated styrene-butadiene block copolymer (acid value: 5)

TABLE 6

| | Polymer | Hot-melt Adhesive | |
|---|---|---|---|
| | Composite Thermal Stability % | Shear Strength by Tension Loading kgf/cm² | Peel Strength g/25 mm |
| Ex. | | | |
| 21 | 95 | 10 | 1100 |
| 22 | 94 | 13 | 1250 |
| 23 | 97 | 15 | 1400 |
| 24 | 94 | 18 | 1500 |
| 25 | 97 | 21 | 1300 |
| 26 | 97 | 20 | 1000 |
| 27 | 95 | 20 | 1800 |
| 28 | 94 | 11 | 1700 |
| 29 | 98 | 18 | 1600 |
| Comparative Ex. | Resin | | |
| 8 | 96 | 9 | 900 |
| 9 | 80 | 5 | 600 |

(Remarks)
Shear strength by Tension Loading: JIS K6854 (on a aluminum plate)
Peel Strength: JIS K6854 (on a PET film)
Thermal Stability: Represented by viscosity retention percentage of the each composite or resin after it is kept for 5 hours at 190° C. in inert gas atomsphere.

The Industrially Applicable Field of the Invention

The polymer composite of the present invention is useful particularly as an adhesive and an elastomer, and is capable for use to be as an organic solvent solution, an emulsion, a dispersion, or in form of film and sheet. The adhesive may be obtained by mixing an additive with the polymer composite, according to its necessity to the polymer composite, in a kneading machine. To obtain a laminate, thus obtained adhesive is to adhere to a substrate by coating, extrusion process, and coextrusion process. As a substrate, there may be plastic film or sheet provided from polyethylene, polypropylene, polyvinyl acetate, cellulose acetate, polyester, polycarbonate, polyamide, polyimde, polyacrylic acid ester, polymethacrylic ester, polystyrene, and polyvinyl alcohol and the like; metallic paper such as aluminium foil; paper; and fibrous sheet.

The polymer composite of the present invention is useful to be an adhesive used for an adhesive tape, an adhesive label, setting plastic parts, carpet back sizing, a sanitary stuff such as a diaper, setting automobile parts.

The polymer composite of the present invention is molded and/or formed with additives according to necessity by extrusion molding, injection molding, blow molding, and the like. Molded articles are foot gears, containers, toys, household equipments, packings, and the like. Furthermore, the polymer composite of the present invention may be used to improve mechanical properties of polystyrene and rubber, and may also be used for the improvement of low temperature resistant of asphalt.

I claim:

1. A polymer composite comprising a matrix phase and a dispersed phase dispersed in said matrix phase, produced by a process which comprises polymerizing, without employing a substantial amount of a solvent, (1) a styrenic monomer component, in the presence of (2) a rubbery copolymer, and (3) a polyolefin, wherein the component (2) comprises from 50 to 300 parts by weight and the component (3) comprises from 50 to 300 parts by weight, relative to 100 parts by weight of said styrenic monomer component, wherein said matrix phase comprises (i) said polyolefin and (ii) a graft copolymer formed by graft polymerizing said styrenic monomer component onto said polyolefin; wherein said dispersed phase comprises (iii) a polymer of said styrenic monomer component, and (iv) a graft copolymer formed by graft polymerizing said styrenic monomer component onto said rubbery copolymer.

2. The polymer composite according to claim 1, wherein the styrenic monomer component is styrene or a combination of styrene and an acrylate ester or a methacrylate ester.

3. The polymer composite according to claim 1, wherein the polyolefin is a polypropylene or an ethylene-vinyl acetate copolymer, 4. The polymer composite according to claim 1, wherein the rubbery copolymer is an olefin-diene copolymer.

5. The polymer composite according to claim 1, wherein the rubbery copolymer is a styrenic monomer-diene copolymer.

6. The polymer composite according to claim 5, wherein the styrenic monomer-diene copolymer comprises 5 to 90% by weight of a styrenic monomer unit.

7. The polymer composite according to claim 1, which contains a homopolymer of the styrenic monomer component.

8. The polymer composite according to claim 1, further comprising a filler, a tackifier, or an antioxidant.

9. The polymer composite according to claim 1, wherein the styrenic monomer component polymerization is carried out by kneading.

10. The polymer composite according to claim 1, wherein the polymer (iii) is contained in an amount ranging from 20 to 80% based on the total weight of the polymer composite.

11. The polymer composite according to claim 10, wherein the dispersed phase is in the form of particles having a diameter less than 10 μm.

12. The polymer composite according to claim 10, wherein the styrenic monomer component is styrene; and said rubbery copolymer is selected from the group consisting of olefin-diene copolymers, styrene monomer-diene copolymers, and partially hydrogenated products thereof.

13. The polymer composite according to claim 10, wherein the styrenic monomer component is styrene or a mixture of styrene and an acrylate ester or a methacrylate ester; said polyolefin is a polypropylene or an ethylene-vinyl acetate copolymer; and said rubbery copolymer is a styrenic monomer-diene copolymer.

14. The polymer composite according to claim 13, wherein said polymer (iii) is a homopolymer.

15. The polymer composite according to claim 1, wherein the styrenic monomer component is polymerized in a first shearing zone of a kneading reactor while in the presence of the rubbery copolymer and the polyolefin and then the remaining unreacted styrenic monomer component is removed from the reactor in a second shearing zone where the shearing force is greater in said first shearing zone than in said second shearing zone.

16. The polymer composite according to claim 15, wherein the kneading reactor is a single screw extruder or a twin screw extruder.

17. A molded article of the polymer composite according to claim 1.

18. A laminate structure comprising the polymer composite according to claim 1 as an intermediate tie layer.

* * * * *